United States Patent [19]

Renault et al.

[11] 3,966,891

[45] June 29, 1976

[54] PROCESS FOR MANUFACTURING SULFUR FROM A SOLUTION OF SODIUM SULFITE

[75] Inventors: Philippe Renault, Noisy-le-Roi; André Deschamps, Chatou; Claude Dezael, Maisons-Lafitte, all of France

[73] Assignee: Institut Francaise du Petrole, des Carburants et Lubrifiants, Rueil-Malmaison, France

[22] Filed: Oct. 15, 1973

[21] Appl. No.: 406,348

[30] Foreign Application Priority Data
  Oct. 20, 1972 France .............................. 72.37418

[52] U.S. Cl. ............................ 423/574 R; 423/183; 423/242; 423/428; 423/548; 423/551; 423/575

[51] Int. Cl.² .................. C01B 17/04; C01B 17/60; C01C 1/244; C01D 5/08

[58] Field of Search .......... 423/186, 189, 202, 242, 423/421, 422, 423, 428, 539, 541, 567, 569–573, 575, 548, 183, 557

[56] References Cited
UNITED STATES PATENTS

| | | |
|---|---|---|
| 1,294,526 | 2/1919 | Vis ..................................... 423/428 |
| 2,518,530 | 8/1950 | Dooley ........................... 423/428 X |
| 3,493,329 | 2/1970 | Stiers .................................... 423/428 |
| 3,561,925 | 2/1971 | Deschamps et al. ............ 423/573 X |
| 3,598,529 | 8/1971 | Deschamps et al. ................. 423/575 |
| 3,846,535 | 11/1974 | Fonseca ............................... 423/242 |
| 3,846,538 | 11/1974 | Renault et al. ...................... 423/575 |
| 3,846,539 | 11/1974 | Renault et al. ...................... 423/574 |

FOREIGN PATENTS OR APPLICATIONS

| | | |
|---|---|---|
| 500,349 | 1/1951 | Belgium .............................. 423/422 |
| 1,768,840 | 8/1971 | Germany ............................ 423/166 |
| 1,084,096 | 9/1967 | United Kingdom................. 423/242 |
| 1,427 | 3/1883 | United Kingdom................. 423/539 |
| 765,673 | 1/1957 | United Kingdom................. 423/232 |

*Primary Examiner*—Oscar R. Vertiz
*Assistant Examiner*—Gary P. Straub
*Attorney, Agent, or Firm*—Millen, Raptes & White

[57] ABSTRACT

A solution of sodium sulfite or sulfide is reacted with ammonium sulfate, so as to produce a gas containing $SO_2$ or $H_2S$, $NH_3$ and $H_2O$, which is thereafter treated for sulfur production and $NH_3$ recovery, and a liquid outflow containing sodium sulfate which is reacted with $CO_2$ and $NH_3$, in order to produce $NaHCO_3$ and regenerate the ammonium sulfate. $NaHCO_3$ may be converted to sodium carbonate and $CO_2$, the latter being re-used in the process.

10 Claims, 1 Drawing Figure

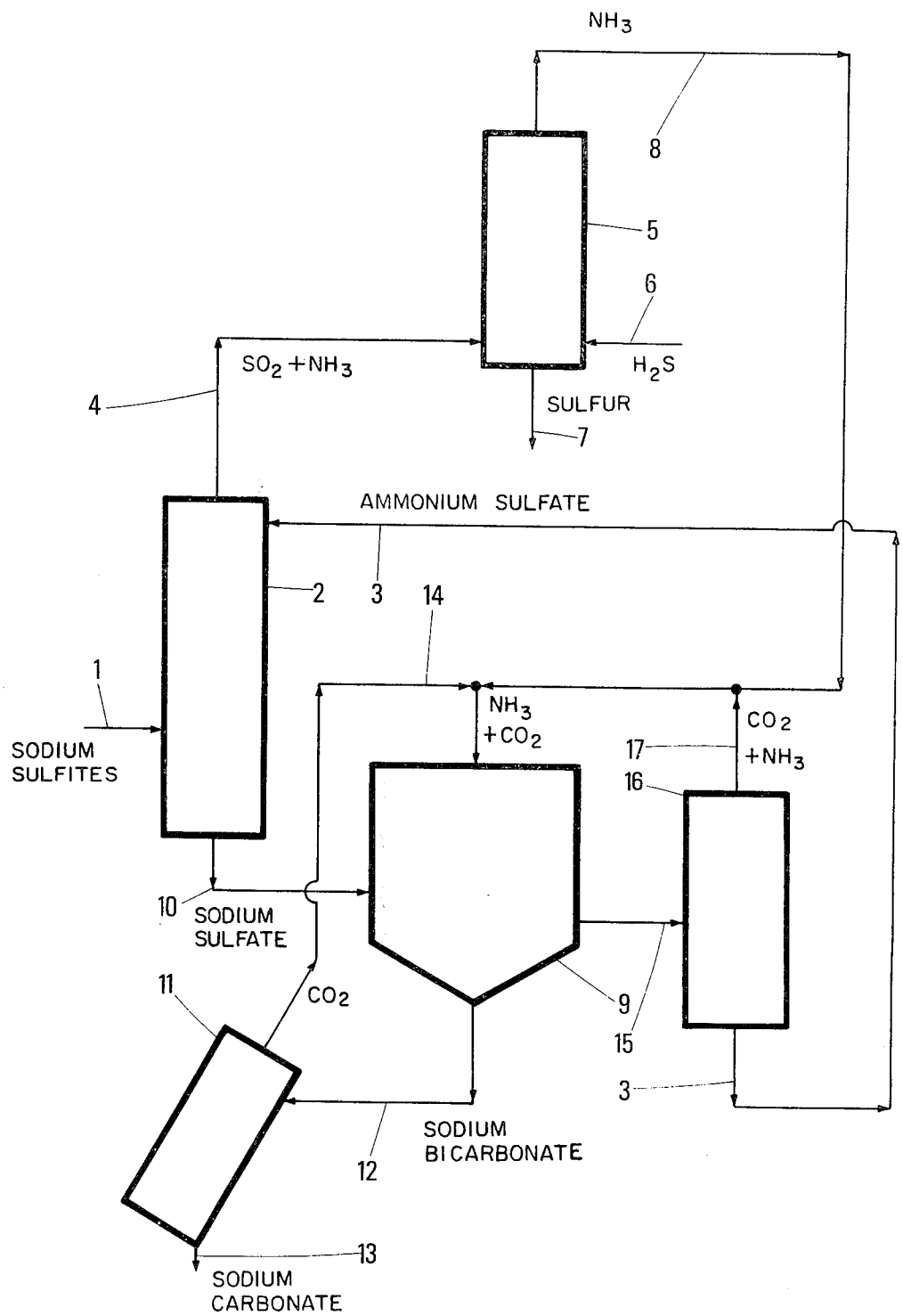

PROCESS FOR MANUFACTURING SULFUR FROM A SOLUTION OF SODIUM SULFITE

This invention concerns a process for manufacturing sulfur from aqueous solutions of sodium sulfites or sulfides, resulting for example from purifying a gas containing sulfur compounds, such as sulfur dioxide, sulfur trioxide or hydrogen sulfide by means of a solution of sodium hydroxide or, when required, sodium carbonate, with production of sodium carbonate.

Combustion off-gasses, particularly waste-gas from power plants fed with fuel-oil or other sulfur-containing combustion sustaining materials, or from incinerators for burning sulfur-containing compounds, contain $SO_2$ and, in a lower proportion, $SO_3$ which constitute major pollutants. On the other hand, some chemical plants, for example those manufacturing sulfuric acid, emit $SO_2$-containing waste-gas.

These off-gases may be made free of sulfuric anhydride ($SO_3$) and have their content of sulfurous anhydride ($SO_3$) and have their content of sulfurous anhydride ($SO_2$) lowered to about 50-100 ppm by volume by washing with an aqueous solution of sodium hydroxide or sodium carbonate. Sulfitic brines are thus produced, which if not re-used or regenerated, would pollute water.

Other industrial waste-gases contain hydrogen sulfide, a nauseous and toxic compound, which may also be removed by washing with an aqueous solution of sodium hydroxide or preferably sodium carbonate. Brines containing sodium sulfide are thus produced; said compound must be transformed before being discharged to waste.

These solutions may be made free of acid gases according to the following technique :sodium sulfites or sulfides are converted to easily dissociable ammonium sulfites or sulfides which may be transformed to sulfur and ammonia according to a technique previously proposed by the applicants.

This process offers the advantage of being low in power consumption, as compared with regeneration processes operated by heating of the solutions.

The proposed process consists of contacting the aqueous solutions of sodium sulfites or sulfides with ammonium sulfate preferably in excess with respect to the stoichiometrical amount, so as to obtain release of gaseous sulfurous anhydride or hydrogen sulfide, ammonia and water, from which is produced sulfur and an aqueous solution containing sodium sulfate which is treated with carbon dioxide and ammonia at low temperature, so as to precipitate the alkali metal in the form of sodium hydrogen carbonate (sodium bicarbonate) which will provide all or a part of the reactants used according to the invention.

The process may be carried out in several steps.

In a first step (a), brine obtained for example by absorbing $SO_2$ or $H_2S$ contained in an industrial off-gas, is contacted with ammonium sulfate. This brine is an aqueous solution of sodium sulfite, optionally containing sulfates, or sodium sulfide; it contains usually 0.5 to 5 moles of salt per liter, preferably 3 to 4 moles per liter. This step is generally conducted at a temperature of from 50° to 150°C, preferably at about 100°C, so as to obtain a gas stream containing $SO_2$ or $H_2S$, $NH_3$ and water, corresponding to the conversion of ammonium sulfite or sulfide formed during the reaction. The solution collected as other product of this step contains essentially sodium sulfate and, when present, ammonium sulfate representing the excess thereof over the stoichiometrical amount necessary to the reactions.

Under these conditions, the collected solution contains practically no more sulfite or sulfide, since the latter have been converted. Pressures higher than 1 atmosphere may be used, for example 0.1 – 10 atmospheres, preferably 1 – 5 relative atmospheres.

The reactions which take place in this step are the following:

$Na_2SO_3 + (NH_4)_2SO_4 \rightarrow NA_2SO_4 + SO_2 + 2NH_3 + H_2O$ $2^{NaH}SO_3 + (NH_4)_2SO_4 \rightarrow Na_2SO_4 + 2SO_2 + 2NH_3 + 2H_2O$ $Na_2S + (NH_4)_2SO_4 \rightarrow Na_2SO_4 + H_2S + 2NH_3$ $2_{NaH}S + (NH_4)_2SO_4 \rightarrow Na_2SO_4 + 2H_2S + 2NH_3$ (In accordance with the above reaction, the terms sodium sulfite and sulfide include the bisulfite and bisulfide as well).

The resulting vapor, containing the products resulting from converting the ammonium sulfites and sulfides, may now be treated in a known manner by contacting the same, in a step (b) with the calculated amount of reactant, so as to obtain the following reaction :

$2 H_2S + SO_2 \leftrightarrows 3 S + 2 H_2O$

Sulfur is thus obtained.

This reaction may be carried out in the gas phase or preferably in the liquid phase, so as to avoid by-products. An organic solvent is used, in that case, for example polyethylene glycol at a temperature of from 20° to 160°C, usually about 130°C.

The solvents which may be used in this reaction are well-known by those skilled in the art, so that they will not be mentioned in detail. Organic solvents are preferred, although some inorganic solvents, for example molten sulfur, may be used.

Resulting sulfur is collected and the resulting gas contains essentially water and ammonia which may be used in a further step of the process (step c).

The solution obtained in step (a) and which contains sodium sulfate and possibly some ammonium sulfate is treated so as to precipitate the alkali metal contained therein.

This result is obtained in step (c) by contacting the solution at a relatively low temperature, for example 10°–60°C and preferably about 30°C, with ammonium bicarbonate or a mixture of carbon dioxide, ammonia and water, so as to obtain settling of sodium bicarbonate. After filtration or centrifugation, for example, the latter is roasted in a kiln at a temperature of from 50° to 150°C, preferably about 110°C. Sodium carbonate is obtained and may be used to constitute the absorbing solutions; carbon dioxide is also obtained, which may be used in the process, for example in step (c).

The following reaction takes place in step (c):

$Na_2SO_4 + 2CO_2 + 2NH_3 + 2H_2O \rightarrow 2Na\ HCO_3 + (NH_4)_2SO_4$

An aqueous solution of ammonium sulfate and sodium bicarbonate, remaining un-precipitated at this temperature, is obtained in this step.

By heating the solution, above 100°C, for example at 100 – 200°C under atmospheric pressure, there is obtained in a step (d) a reaction between the constituents of the solution and there are recovered, in the resulting effluent gas, carbon dioxide, ammonia and water which will be used to constitute at least one part of the precipitation agent of step (c).

Since the proportion of sodium carbonate carried away is low, little ammonium sulfate is consumed in the reaction; the solution recycled to step (a) contains essentially ammonium sulfate and some sodium sulfate.

This step (d) may be omitted without inconvenience. The same reactions will then occur in the reactor of step (a) where the conditions are favorable thereto.

When desired, sodium sulfate may be purged and if the proportions are relatively high, by treating a fraction of the ammonium sulfate containing solution with sodium carbonate, before recycling same to the reactor of step (a).

The following non-limitative illustrate the invention:

EXAMPLE 1

The following example, illustrated by FIG. 1, shows a non-limitative preferred scheme.

1 m³ per hour of brine, resulting from washing out $SO_2$ contained in an industrial gas, is fed through line 1 to a reactor 2, maintained at about 110°C. The brine composition is 104 g/liter $NaHSO_3$ and 107 g/liter $Na_2SO_3$. This reactor is also charged via line 3 with an aqueous solution containing 265 g/liter of $(NH_4)_2SO_4$ and 92 g/liter of $Na_2SO_4$. The vapor excaping through line 4 and containing $SO_2$, $NH_3$ and $H_2O$, is contacted in reactor 5 with a gas containing $H_2S$ and $CO_2$ supplied from line 6 and obtained by conversion of natural gas according to the reaction:

$$4\ S + CH_4 + 2H_2O \rightarrow 4\ H_2S + CO_2$$

Reactor 5 contains polyethylene glycol of an average molecular weight of 400 at a temperature of about 130°C. The two acid gases react to produce 178 kg of sulfur per hour. Sulfur is removed from the reactor through pipe 7. The effluent gas is discharged through line 8; it consists essentially of steam, $NH_3$ and $CO_2$.

This gas is fed through line 8 to a reactor 9 where the temperature is about 30°C, and the gas contacts the aqueous solution collected at the bottom of reactor 2, said solution being supplied from line 10 and containing $(NH_4)_2SO_4$ and $Na_2SO_4$. By this contact, $NaHCO_3$ and $(NH_4)_2SO_4$ are thus formed. A portion of $NaHCO_3$ settles and is discharged from the bottom of reactor 9 provided with filtration means. It is fed through line 12 to oven 11 where it is roasted. 138 kg of $Na_2CO_3$ is recovered in 1 hour through line 13; $CO_2$ is discharged through line 14 and then into reactor 9.

The collected aqueous filtration solution is passed through line 15 to a reactor 16 where it is re-heated to about 100°C. Any $NaHCO_3$ remaining in the solution reacts with $(NH_4)_2SO_4$ and a gas containing $H_2O$, $CO_2$ and $NH_3$ is released through line 17. The solution collected at the bottom of reactor 16 is thus regenerated; it is passed through line 3 to reactor 2. The following reaction takes place:

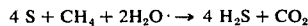

EXAMPLE 2

The apparatus is as hereinbefore disclosed.

1 m³ per hour of brine obtained by removing $SO_2$ and $SO_3$ from a gas and containing per liter :

| | |
|---|---|
| $NaHSO_3$ | 208 g |
| $Na_2SO_3$ | 88.5 g |
| $Na_2SO_4$ | 71 g | is treated in reactor 2. It is contacted at about 110°C with an aqueous solution of :

| | |
|---|---|
| $(NH_4)_2SO_4$ | 325 g/liter |
| $Na_2SO_4$ | 92 g/liter |

The released gas, containing $H_2O$, $SO_2$ and $NH_3$ is reacted with a gas flow within a reaction medium consisting of polyethylene glycol of an average molecular weight of 400; said gas flow containing $H_2S$ and $CO_2$ and resulting from converting a gas containing sulfur and methane. 273 kg per hour of sulfur is produced and separated; a gas flow of $H_2O$, $NH_3$ and traces of unconverted $H_2S$ is also obtained. It is contacted in reactor 9 with the aqueous solution collected at the bottom of reactor 2, said solution containing $(NH_4)_2SO_4$ and $Na_2SO_4$.

$NaHCO_3$ is withdrawn from the bottom of the reactor and heated up to 120°C in a kiln wherefrom a $CO_2$ containing gas is released. 196 kg per hour of $Na_2CO_3$ is produced. The resulting solution, withdrawn from the reactor is heated up to about 110°C. The released gas contains $H_2O$, $NH_3$ and $CO_2$.

The resulting liquid phase is recycled to reactor 2. A purge is also made on this line, by treating a small amount of solution with $NA_2CO_3$, so as to transform any $(NH_4)_2SO_4$ contained therein to $Na_2SO_4$ which is rejected. The latter operation results in a release of $CO_2$ and $NH_3$ which rejoin the other obtained gas flows and are introduced into the reactor of $NaHCO_3$ precipitation.

EXAMPLE 3

An aqueous solution, obtained by absorbing $H_2S$ from an industrial gas by means of a sodium hydroxide solution, is treated in a reactor at about 110°C by means of a $(NH_4)_2SO_4$ solution.

The first solution contains 112 g/liter of $NaHS$ and 78 g/liter of $Na_2S$; it is treated at a rate of 1 m³/hour. The second solution contains about 400 g/liter of $(NH_4)_2SO_4$ and 92 g/liter of $Na_2SO_4$.

The effluent gas consists of $H_2S$, $NH_3$ and $H_2O$. It is contacted at about 130°C with a $SO_2$ containing gas flow in a reactor containing polyethylene glycol of an average molecular weight of 400. 144 kg/hour of sulfur are produced and separated, as well as a gas containing ammonia and water.

The collected aqueous solution, following treatment of the sulfide containing solution, contains $Na_2SO_4$ and $(NH_4)_2SO_4$.

After treatment at 30°C with $CO_2$, $NH_3$ and water, we obtain $NaHCO_3$ which is filtered out and then roasted, so as to produce 212 kg/hour of $Na_2CO_3$ and $CO_2$, and also a solution. The latter contains $NaHCO_3$ remaining unprecipitated at this temperature and $(NH_4)_2SO_4$; it is heated up to 110°C and yields a gas containing $CO_2$, $NH_3$ and $H_2O$, which is added to the gas released from the reactor for conversion to sulfur and to $CO_2$ evolved from the kiln, so as to yield the precipitation agent for $NaHCO_3$. A gas containing $CO_2$ and evolved, for example, from a lime-kiln is also added to said gas. This lime-kiln also produces $CaO$ which may be used to convert $Na_2CO_3$ to sodium hydroxide. A solution containing about 400 g/liter of $(NH_4)_2SO_4$ and 92 g/liter of $Na_2SO_4$, i.e. the composition of the solution used to treat the sulfide solution, is also collected.

What we claim is:

1. A process for manufacturing sulfur from a sodium sulfite solution, comprising the steps of (a) reacting said sodium sulfite solution with ammonium sulfate, $(NH_4)_2SO_4$ to produce a gas containing sulfur dioxide and ammonia and a liquid outflow containing sodium sulfate, (b) reacting said gas with hydrogen sulfide, to produce sulfur, and separating said produced sulfur from the remaining ammonia containing gas, (c) reacting said liquid outflow with carbon dioxide and ammonia to convert sodium sulfate to ammonium sulfate and to form a precipitate of sodium bicarbonate, (d) separating said precipitate from the ammonium sulfate containing liquid outflow and (e) recycling the liquid outflow from step (d) to step (a) for contact with the sodium sulfite solution.

2. A process according to claim 1, wherein the ammonia containing gas recovered from step (b) is supplied to step (c).

3. A process according to claim 1, wherein the precipitate of sodium bicarbonate is heated to convert same to sodium carbonate and carbon dioxide gas, and the latter is recycled to step (c).

4. A process according to claim 1, wherein, after separation of the sodium bicarbonate precipitate in step (d), the ammonium sulfate containing liquid outflow is heated to 100°–200°C to react dissolved sodium bicarbonate with said ammonium sulfate to evolve carbon dioxide and ammonia, and resultant evolved carbon dioxide amd ammonia are fed bacl tp step (c).

5. A process according to claim 1, wherein the sodium sulfite solution is reacted with said ammonium sulfate in step (a) at a temperature of from 50° to 150°C under sufficient pressure for maintaining said solution in the liquid phase.

6. A process according to claim 1, wherein said step (c) is carried out at about 10°–60°C.

7. A process according to claim 3, wherein said sodium carbonate is dissolved into water and the resulting solution is contacted with a sulfur dioxide containing gas, to produce the sodium sulfite solution of step (a).

8. A process according to claim 3, wherein said sodium carbonate is converted to sodium hydroxide, said sodium hydroxide is dissolved into water and the resulting solution is contacted with a sulfur dioxide containing gas, to produce the sodium sulfite solution of step (a).

9. A process according to claim 1, wherein the ammonium sulfate employed in step (a) is in the form of an aqueous solution consisting essentially of ammonium sulfate.

10. A process according to claim 1, wherein step (a) is carried out with a solution containing substantially only ammonium sulfate and sodium sulfate.

* * * * *

UNITED STATES PATENT OFFICE
CERTIFICATE OF CORRECTION

PATENT NO. : 3,966,891
DATED : JUNE 29, 1976
INVENTOR(S) : PHILIPPE RENAULT ET AL

It is certified that error appears in the above-identified patent and that said Letters Patent are hereby corrected as shown below:

Claim 4, last line, last four words should read -- back to step (c). --.

Signed and Sealed this

Twenty-third Day of November 1976

[SEAL]

Attest:

RUTH C. MASON
Attesting Officer

C. MARSHALL DANN
Commissioner of Patents and Trademarks